(12) United States Patent
Naruszewicz et al.

(10) Patent No.: US 8,699,962 B2
(45) Date of Patent: Apr. 15, 2014

(54) SYSTEMS AND METHODS FOR PREPARING A TELECOMMUNICATION NETWORK FOR PROVIDING SERVICES

(75) Inventors: Leszek Naruszewicz, Zywiec (PL); Krzysztof Ronald Grochla, Pyskowice (PL); Aleksander Karol Seman, Rybnik (PL); Yair Bourlas, San Diego, CA (US)

(73) Assignee: Proximetry, Inc., San Diego, CA (US)

( * ) Notice: Subject to any disclaimer, the term of this patent is extended or adjusted under 35 U.S.C. 154(b) by 139 days.

(21) Appl. No.: 13/424,145

(22) Filed: Mar. 19, 2012

(65) Prior Publication Data

US 2013/0157585 A1 Jun. 20, 2013

Related U.S. Application Data

(60) Provisional application No. 61/576,270, filed on Dec. 15, 2011.

(51) Int. Cl.
*H04B 1/38* (2006.01)

(52) U.S. Cl.
USPC ....... 455/73; 455/67.11; 455/411; 455/414.1; 455/524; 455/435.3; 370/254; 370/328; 370/338; 709/220; 709/224; 379/201.03; 379/221.09

(58) Field of Classification Search
USPC ........... 455/73, 67.11, 411, 414.1, 524, 435.3
See application file for complete search history.

(56) References Cited

U.S. PATENT DOCUMENTS

| | | | |
|---|---|---|---|
| 7,340,247 B1 | 3/2008 | O'Hara, Jr. | |
| 7,392,050 B2 | 6/2008 | Svensson | |
| 7,512,131 B2 * | 3/2009 | Svensson et al. | 370/395.21 |
| 7,653,030 B2 | 1/2010 | Arrakoski | |
| 7,711,000 B2 * | 5/2010 | Hu et al. | 370/465 |
| 7,779,071 B2 * | 8/2010 | Lor et al. | 709/203 |
| 7,818,008 B2 * | 10/2010 | Kalavade | 455/445 |
| 7,890,640 B2 * | 2/2011 | Ribot | 709/229 |
| 7,936,737 B2 | 5/2011 | Doshi | |
| 8,094,551 B2 * | 1/2012 | Huber et al. | 370/229 |
| 8,134,999 B2 * | 3/2012 | Ong et al. | 370/352 |
| 8,331,228 B2 * | 12/2012 | Huber et al. | 370/229 |
| 8,547,872 B2 * | 10/2013 | Raleigh | 370/252 |
| 8,554,945 B1 * | 10/2013 | Cook et al. | 709/238 |
| 8,583,781 B2 * | 11/2013 | Raleigh | 709/224 |
| 2003/0022657 A1 | 1/2003 | Herschberg | |
| 2006/0221940 A1 | 10/2006 | Ong | |
| 2008/0037482 A1 | 2/2008 | Douglas | |
| 2008/0207167 A1 | 8/2008 | Bugenhagen | |
| 2009/0158042 A1 | 6/2009 | Calhoun | |
| 2009/0274047 A1 | 11/2009 | Kruys | |
| 2010/0188971 A1 | 7/2010 | Chiang | |
| 2011/0111729 A1 | 5/2011 | Poltorak | |

FOREIGN PATENT DOCUMENTS

| | | |
|---|---|---|
| EP | 1237334 | 4/2006 |
| WO | WO 2004025910 | 3/2004 |
| WO | WO 2004100435 | 11/2004 |
| WO | WO 2011078646 | 6/2011 |

* cited by examiner

*Primary Examiner* — Marceau Milord
(74) *Attorney, Agent, or Firm* — Letham Law Firm LLC; Lawrence Letham (57) ABSTRACT

Systems and methods for preparing a telecommunication network for communicating with a client by provisioning the telecommunications system for providing services to the client in accordance with provisioning information provided by the client. Provisioning information may be updated in the network using provisioning information provided by the client and vice versa. One criteria for updating provisioning information includes determining which provisioning information is the most recent.

18 Claims, 6 Drawing Sheets

SYSTEMS AND METHODS FOR PREPARING A TELECOMMUNICATION NETWORK FOR PROVIDING SERVICES

CROSS-REFERENCE TO RELATED APPLICATIONS

This application claims priority under 35 U.S.C. §119(e) from U.S. provisional patent application 61/576,270 filed Dec. 15, 2011, which is herein incorporated by reference.

FIELD OF THE INVENTION

Embodiments of the present invention relate to systems and methods for preparing a telecommunication network for providing services to a client device.

BACKGROUND OF THE INVENTION

Prior to communication between a terminal and a telecommunication network, provisioning information is used to configure the telecommunication network to communicate with the terminal. A network management system of the telecommunication network may store provisioning information and provide the provisioning information when needed to configure the telecommunication network to provide communication with a terminal. Providing provisioning information and configuring a telecommunication network for communication may be referred to as provisioning a network.

A terminal may benefit by providing provisioning information to a telecommunication network for configuring the telecommunication network for communication as opposed to configuring the network using provisioning information stored by the network.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

Before a client device can communicate (e.g., transmit, receive) over a telecommunication network (e.g., network, communication network) with a server or other devices coupled to the network, the network must be configured to provide services to the client device. A network may be configured to provide services to a client using provisioning (e.g., operational, configuration) information (e.g., parameters, data). Provisioning information may include Quality of Service ("QoS") requirements, traffic classification patterns, radio configuration (e.g., parameters), device configuration, interface configuration, data assignment attributes, and/or authority information. Providing services to a client includes communicating wirelessly with a client in accordance with a type of service, a quality of service, and/or other attributes as discussed above.

QoS requirements may include a number of communication streams (e.g., channels, links) requested for communication. A stream may include communication at a dedicated bandwidth (e.g., minimum, maximum) or on a best effort basis. QoS requirements may further include minimum bandwidth, maximum bandwidth, delay (e.g., latency), jitter, packet loss rate, and bit loss rate. QoS requirements for minimum bandwidth, maximum bandwidth, delay, jitter, packet loss rate, and bit loss rate may be requested for each stream requested. QoS requirements may be consistent with a type of service (e.g., video, voice over IP, data, web browsing) communicated. Each QoS requirements may be assigned a value.

Traffic classification includes detecting characteristics of data communicated on a network and comparing the detected characteristics to patterns associated with different types of data. Characteristics may include port number (e.g., HTTP: 80, FTP: 21), payload characteristics, host behavior, and flow features. Payload characteristics may be used to identify applications that provide the payload (e.g., FTP, SMTP, HTTP, HTTPS, SSH, DNS, NTP). For example, a traffic classification pattern for detecting a web browsing application includes a destination address for a particular client (e.g., client A), a source port (e.g., HTTP source port 80), and a protocol (e.g., TCP). Traffic classification patterns may be used to determine whether data is consistent with the type of service requested by a client.

Traffic classification may be used to enforce QoS requirements. For example, a network device (e.g., base station, access point, server, transmission network, network management system) may use traffic classification patterns to identify traffic for different types of service (e.g., per client, per application). The network device may drop data having a particular pattern when the maximum bandwidth for that type of service is exceeded.

Radio parameters may include modulation and antenna configuration.

Authority information provides information about the provisioning information. Authority information may include date of creation, entity that created the provisioning information, date of issue, effective date, and/or revision number.

Provisioning information may be used to establish different types of communication service between a network and a client. For example, provisioning information may be used to establish a virtual private network ("VPN") connection so that a client may communicate with an enterprise network. Provisioning information may instruct a base station and/or server of a network to establish a tunnel from the base station and/or server of the network to a particular destination (e.g., IP address) in an enterprise network. Data from the client is forwarded by the base station and/or server of the network to the tunnel that transports the data to the enterprise network.

In another example, provisioning information may be used to establish a subscription message service. A network device may receive, store, and/or transmit data. The data may include information regarding topics (e.g., road traffic, weather, news, multimedia data) that are updated regularly and/or frequently. When the network device receives new data, the network device may forward the data to all clients provisioned for the subscription service.

In another example, provisioning information may establish one or more streams between a client and a base station of the network. Each stream may provide a type of service to the client. For example, one stream may be for communicating video. Another stream may be for browsing the internet. The network may be configured by the provisioning information to provide the video data at a dedicated bandwidth (e.g., greater than a minimum). The network may be configured to provide the data received from browsing the internet on a best effort basis.

Provisioning information may further include a request (e.g., command, instruction) to collect statistical information. Statistical information may include information regarding the network, a server of the network, a communication performance of the network, a communication protocol, a base station, and/or a client that communicates with the network. Statistical information may include information regarding detected events and/or operations of a network and/or a client. Events and/or operations may include the events and/or operations provided in Table 1. Each statistic may be classified (e.g., specified, described) by a group and a name. Each statistic may describe (e.g., define) an event to be monitor. A network, a portion of a network, and/or a client may be monitored to detect statistical information.

TABLE 1

Statistics

| Group | Statistic Name | User Readable Name |
| --- | --- | --- |
| Device level statistics | cpu_usage | CPU usage |
| Device level statistics | mem1_usage | Physical Memory usage |
| Device level statistics | mem2_usage | Flash memory usage |
| Device level statistics | uptime | Uptime |
| Device level statistics | temp1 | Mainboard temperature |
| Device level statistics | temp2 | WiMAX card temperature |
| Interface L2 rates | tx_data | TX data rate |
| Interface L2 rates | rx_data | RX data rate |
| Interface L2 rates | tx_frame | TX frame rate |
| Interface L2 rates | rx_frame | RX frame rate |
| Interface L3 rates | tx_data rate | TX data rate |
| Interface L3 rates | rx_data rate | RX data rate |
| Interface L3 rates | tx_packet_rate | TX packet rate |
| Interface L3 rates | rx_packet_rate | RX packet rate |
| Interface L3 rates | tx_err_rate | TX packet error rate |
| Interface L3 rates | rx_err_rate | RX packet error rate |
| Connection L1 | modulation1 | Spectral efficiency |
| Connection L1 | rssi | RSSI |
| Connection L1 | cinr | CINR |
| Connection L1 | tx_power | TX power |
| Connection L2 rates | tx_data | TX data rate |
| Connection L2 rates | rx_data | RX data rate |
| Connection L2 rates | tx_frame | TX frame rate |
| Connection L2 rates | rx_frame | RX frame rate |
| Service flow rates | sf_rate | SF rate |
| Service flow rates | sf_error | SF error rate |
| Service flow rates | sf_frame | SF frame rate |
| Interface service flow rates | sf_rate | SF rate |
| Interface service flow rates | sf_error | SF error rate |
| Interface service flow rates | sf_frame | SF frame rate |
| GPS | long | Longitude |
| GPS | latt | Latitude |
| GPS | alt | Altitude |
| GPS | speed | Speed |

Monitoring may include counting (e.g., tracking) an occurrence of an event. Monitoring may be performed by any conventional electronic device of the network and/or client. For example, a processing circuit of a server and/or a client may monitor events. Monitoring may be enabled or disabled. Monitoring may be enabled or disabled for any statistical information as a group and/or individually. A user may enable or disable monitoring of statistical information. A user may include a user of a client, an administrator of a network, an administrator of a server of a network, a manufacturer of a device (e.g., server, client) of a network. A request for statistical information may include information for enabling or disabling monitoring and/or reporting of statistical information. Monitoring may be performed periodically. A periodicity for monitoring statistical information may be determined by the type of statistical information. A periodicity for monitoring may be established by a user. In one implementation, a user may specify the periodicity of monitoring as a period of time (e.g., hours, minutes, seconds, milliseconds, microseconds). The periodicity for monitoring any statistical information may include a default period of time.

A client and/or network device may include sensors for monitoring. A sensor may detect information regarding a physical characteristic and/or property monitored (e.g., temperature, voltage level, current flow, vibrations, noise level, fan speed, power, bit rate, frame rate, GPS radio signal, CPU loading). A sensor may provide a report of information. Information from sensors may be aggregated and/or analyzed. Information from a sensor may be used to determine statistical information.

Statistical information may be reported (e.g., notice, result). Statistical information may be reported in any conventional manner used to convey and/or report data (e.g., data file, display on monitor, print out, provide to electronic device).

For example, the RSSI statistic may be enabled so that the receive signal strength indicator between a client and a base station is monitored. For each time period for monitoring, the base station records the value of the RSSI. The base station may report the value of the RSSI. The base station may report the statistical information to any device including the client and/or a server of the network.

A network may provide provisioning information to a client device. A network may store provisioning information for each client device that may receive services (e.g., sending data, receiving data, communication services) from the network. Provisioning information may be stored by a device of the network capable of storing information and providing information. For example, a switch (e.g., hub, router) of a wired communication network may store provisioning information of devices that may receive services via the switch. A base station (e.g., access point) may store provisioning information of devices that may receive services via the base station. A base station may use the provisioning information to establish service for a client device. A base station may provide the provisioning information to a client device.

Although many of the examples discuss herein are directed toward wireless networks, the invention is not limited to wireless networks. The invention disclosed herein may be used in wired networks, wireless networks, or any combination thereof.

A network may include any conventional component (e.g., device, hardware, software) of a conventional wired and/or wireless telecommunications network. For example, a network may include terminals, a transmission network, and/or network management systems.

A terminal (e.g., client, client device) may communicate information. A terminal may be a final destination (e.g., sink) for data. A terminal may originate (e.g., source) data. A terminal may include any conventional server, computer, storage device, client, and/or mobile client (e.g., laptop, smart phone, cell phone). A terminal may include any conventional device for communing.

A transmission network may include any conventional component for transmitting (e.g., carrying) data (e.g., digital, analog). A transmission network may transmit data from one physical (e.g., geographic) location to another physical location. A transmission network may include links (e.g., wired, wireless), connections, switches, routers, hubs, processing circuits, memory, converters (e.g., AtoD, DtoA), wires, cables, optical fibers, transmitters, receivers, transceivers, antennas, radio interfaces, repeaters, base stations, and/or access points. A transmission network may include a control plane that communicates (e.g., transmits, receives) control information. A transmission network may include management plane that communicates administrative information (e.g., authentication, security, provisioning). A transmission network may include a data plane that communicates data. The physical layer of a device that communicates using a conventional communication protocol may be considered a part of a transmission network.

A network management system ("NMS") may perform management operations, including administrative operations, of a network. Management operations may include provisioning (e.g., providing provisioning information) the network for providing services, managing (e.g., storage, updating) provisioning information, monitoring performance of the network, authenticating terminals, providing security services, and/or monitoring events (e.g., throughput, outages, health) of a network. An NMS may control collection and/or reporting of statistical information. An NMS may include any conventional servers, computers, software, and/or memory. A component of an NMS may be referred to as a node.

An NMS may be implemented hierarchically with components distributed geographically. A hierarchical NMS may include two or more levels of hierarchy. A node of the hierarchy may perform functions and/or provide services for terminals and components of the network in a geographic area. A hierarchical implementation of an NMS may include a central management node that stores provisioning information for all terminals that may use (e.g., communicate via) the telecommunication network. A central management node may provide information to management nodes at other levels of the hierarchy.

Figure 1:
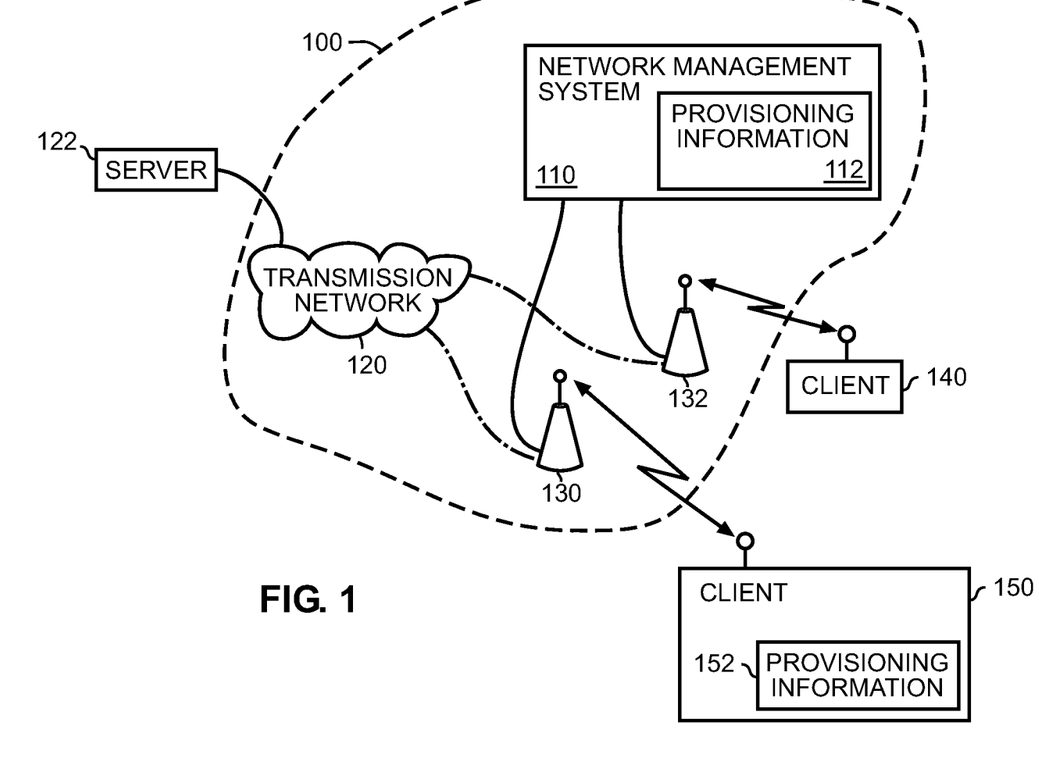
FIGS. 1-3 are functional block diagrams of telecommunication networks and one or more client devices capable of providing provisioning information according to various aspects of the present invention.
Figure 2:
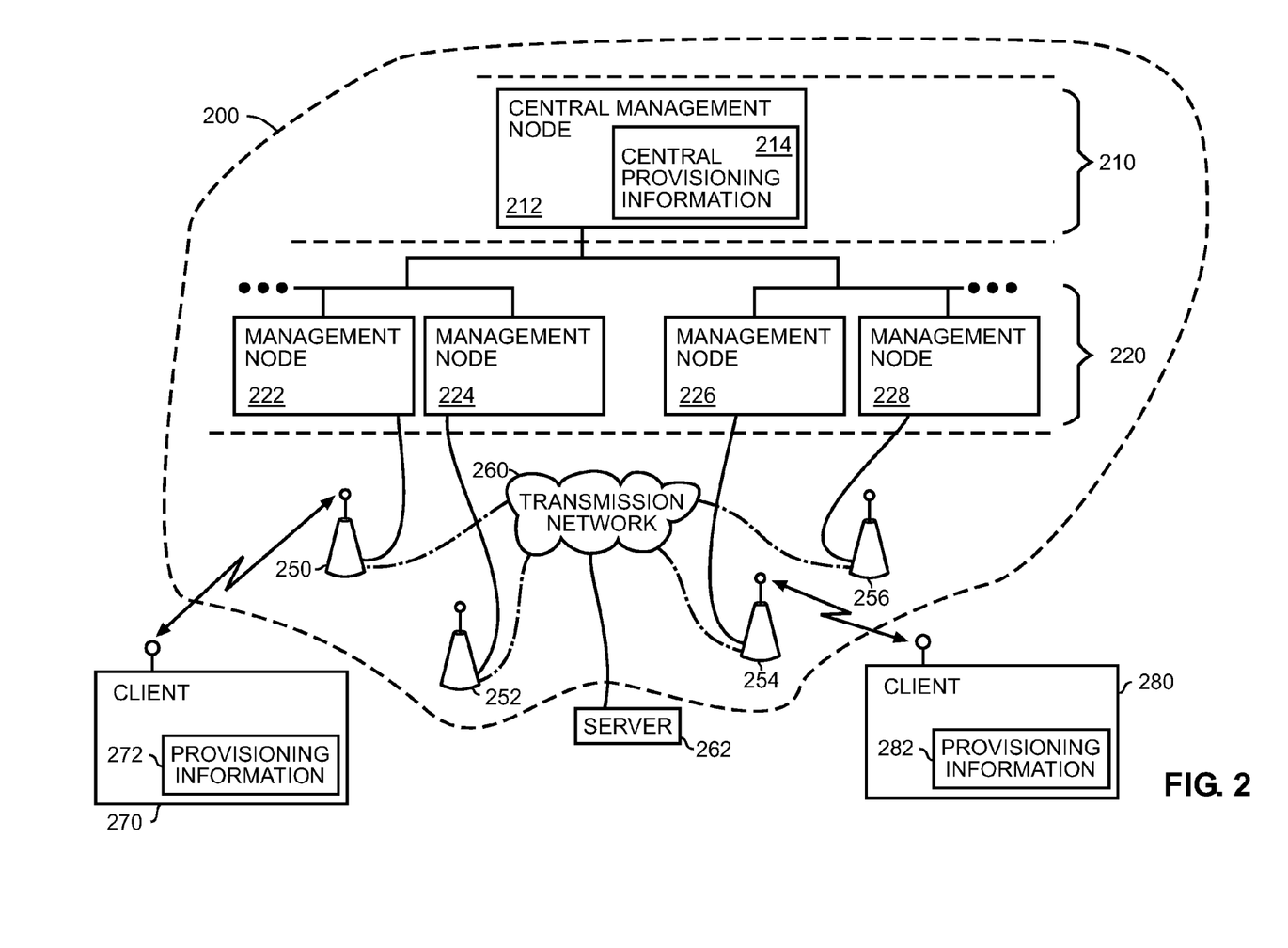
Figure 3:
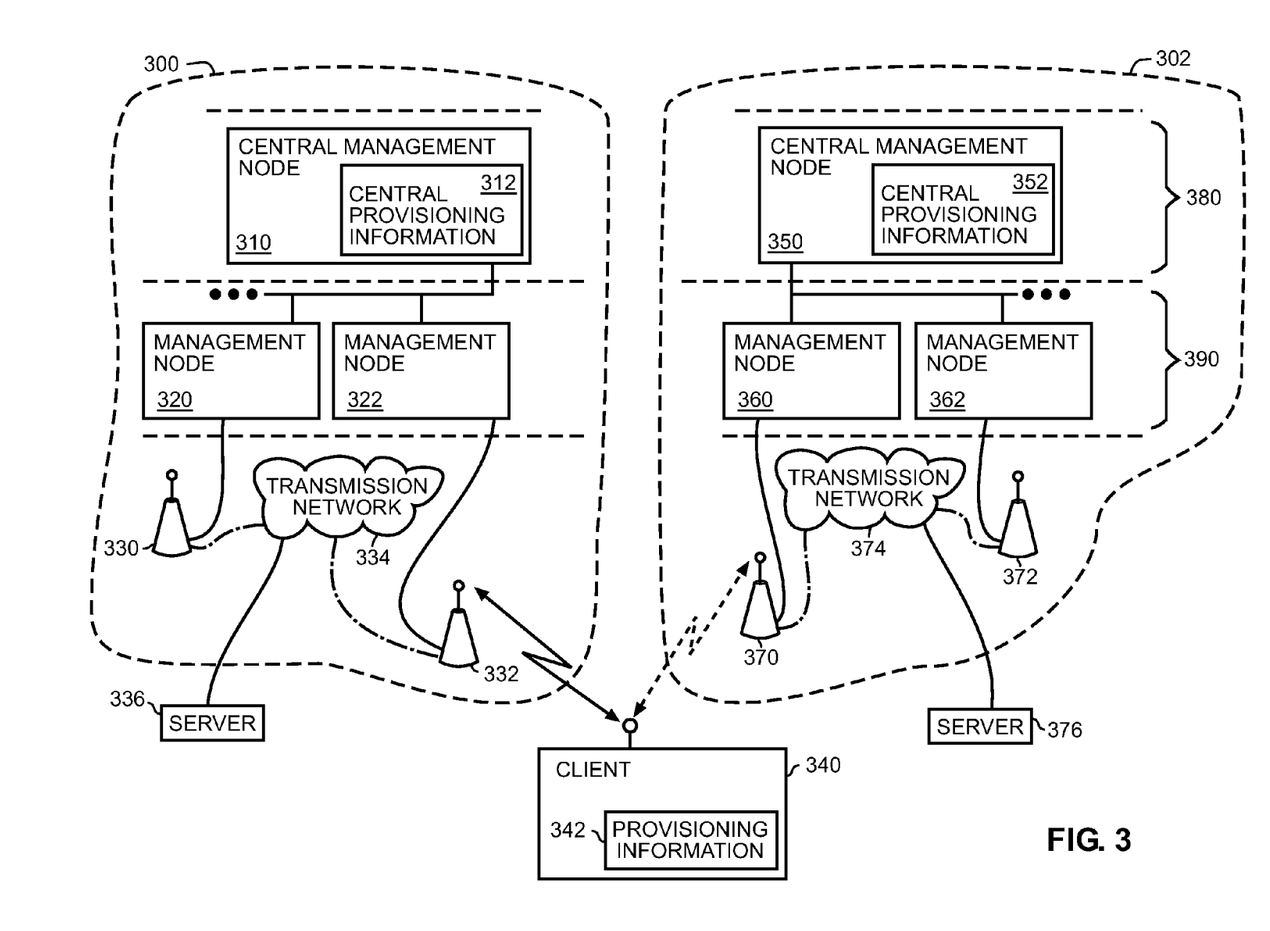

An NMS may communicate with components of the network (e.g., base stations), transmission network, and/or terminals. An NMS may communicate with components of the network, including components of the NMS (e.g., nodes), via the transmission network including the management plane of the transmission network. In FIGS. 1-3, the base stations (130-132/250-256/330-332/370-372) and the connections between the NMS nodes (110/212, 222-228/310, 320-322/350, 360-362) and the base stations are shown separate from transmission network (120/260/334/374) for the purpose of clarity.

Provisioning information stored by an NMS may be used to configure components of the network for providing services to terminals. Provisioning information may be used to configure any component of a network for providing services to a terminal.

A disadvantage of present communication networks is that if the NMS cannot, for any reason, provide provisioning information for a terminal, the terminal cannot join (e.g., associate with, use, communicate via) the network. In the event that the communication between the NMS and the other components of the network is disrupted, all terminals, even terminals that should receive services from the network, may be prohibited from establishing communication with the network.

For example, referring to FIG. 1, network 100 includes NMS 110, provisioning information 112, transmission network 120, and base stations 130 and 132. Server 122 communicates with network 100 via a wired connection. Client (e.g., terminal) 140 and client (e.g., terminal) 150 are mobile clients.

Client 140 does not store provisioning information. Provisioning information for configuring network 100 to provide services to client 140 are stored by NMS 110 as provisioning information 112. To establish communication with base station 132, client 140 provides identifying information to NMS 110 via base station 132. NMS 110 determines whether client 140 may establish a connection with network 100. If client 140 is not recognized by NMS 110 or if client 140 is prohibited from associating with base station 132 for any reason, NMS system 110 instructs base station 132 to not communicate with client 140.

A client (e.g., 140, 270, 280, 340) may detect and/or establish communication with a network using any conventional method and/or any conventional communication protocol (e.g., wired, wireless).

If client 140 is permitted to use network 100, NMS 110 retrieves the provisioning information for client 140 from provisioning information 112. NMS 110 provides the provisioning information for client 140 to base station 132. Base station determines whether it can provide the required levels of service to client 140 in accordance with the provisioning information. If base station 132 cannot provide the required levels of service, base station 132 may elect to not associate with client 140 or base station 132 may terminate communication with other clients (not shown) presently associated with base station 132 in order to establish communication with client 140 in accordance with the requirements of the provisioning information. If base station 132 can provide only a portion of the services specified by the provisioning information, base station 132 may establish communication with client 140 and provide the portion of the services.

If NMS 110 is not available when client 140 desires to establish communication with network 100, possibly due to an in ability of base station 132 to communicate with NMS 110, client 140 cannot establish communication with network 100 because the provisioning information is inaccessible and base station 132 cannot be configured to provide service to client 140.

In accordance with various aspects of the present invention, a client device may store provisioning information. A client device may store provisioning information required to join one or more networks. A client device may provide its stored provisioning information to a network. The provisioning information may be used to configure the network to provide service to the client device. A client device may further provide information to authenticate its identity with a network. A client device may further provide information related to security. A client that provides provisioning information to a network may communicate with and/or receive services from a network without involving an NMS to retrieve and provide provisioning information for the client device.

A client device may include any conventional electronic components for performing the operations discussed herein with respect to a client device. For example, a client device may include a processing circuit, memory, communication devices, user controls, and power supplies. A processing circuit may include any conventional circuit that performs instructions stored in memory (e.g., microprocessor, signal processor, programmable logic, optical processor) to control operation of the client device. A processing circuit may control the operations of the other components of the client device. A processing circuit of a client device may control communication between components of the client device. A processing circuit may include a processor (e.g., microprocessor, signal processor) that executes a program stored in memory to perform the functions of a client device. A processing circuit may include any circuit that performs sequential and/or parallel operations. A processing circuit may include programmable logic devices. A memory may include any conventional storage media (e.g., optical, magnetic, semiconductor). A memory may include any conventional device for receiving, storing, and/or providing information including storage media, communication devices, processing circuit, busses, control circuits, and/or authentication circuits. A memory may be organized to receive, store, and/or transmit data in any manner (e.g., random access, serial access, database query).

A communication device may include any conventional radios, transmitters, receivers, and/or transceivers. A communication device, whether part of a client, base station, or management node, may include a processing circuit that controls the devices of the communication device to perform a conventional communication algorithm.

A processing circuit of a client may be coupled to the memory and/or the communication devices of a client device. A processing circuit may access the memory of the client device to receive the provisioning, security, and/or authentication information. A processing circuit may control the functions of the communication devices of the client device to transfer provisioning, security, and/or authentication information to a base station and/or a server of a network. A processing circuit may receive information from a network via the communication devices of the client. The processing circuit may provide received information to the memory for storage and later retrieval.

A wireless client may store provisioning information in any conventional manner using any memory in any manner (e.g., database, organization). In an implementation, client 150 stores provisioning information 152 in a semiconductor (e.g., flash) memory. A processing circuit of client 150 may read provisioning information 152 from the memory for providing to base station 130. A processing circuit of client 150 may further read security and/or authentication information from the memory to provide to base station 130. A processing circuit of client 150 may further receive information from base station 130 for storing in the memory.

For example, wireless client 150 includes provisioning information 152. Client 150 may provide provisioning information 152 to base station 130. Using the provisioning information 152, and not provisioning information 112 from NMS 110, base station 130 may configure itself and/or other components of network 100 to provide services to client 150 in accordance with the requirements of provisioning information 152. Wireless client 150 may provide provisioning information 152 to base station 130 in any conventional manner (e.g., packetized data). Once client 150 establishes communication with network 100, client 150 may communicate with server 122.

In another example, network 200 includes central management node 212, central provisioning information 214, management nodes 222-228, transmission network 260, and base stations 250-256. Server 262 communicates with network 200 via a wired connection. Client 270 and client 280 are mobile clients.

Central management node 212, central provisioning information 214, management nodes 222-228 form an NMS for network 200. The NMS for network 200 is hierarchical. Central management node 212 and central provisioning information 214 form the highest level of hierarchy indicated by level 210. Central management node 212 communicates with all of the management nodes 222-228 on the next hierarchical level 220. Management nodes 222-228 are on the lowest level of hierarchy and communicate with base stations 250-256. Base stations 250-256 communicate with wireless clients 270 and 280.

Central management node 212 may provide provisioning information to base stations 250-256 via management nodes 222-228. Management nodes 222-228 may store some provisioning information locally to establish communication with a client that does not provide provisioning information. A hierarchical NMS may enable some nodes of the NMS to establish communication with a client that do not provide provisioning information when central management node 212 is not accessible.

The functions of a management node (e.g., central, otherwise) may be performed by a device (e.g., computer, server) comprising a processing circuit, a memory, and communication device. A processing circuit may control the operation of a management node. A processing circuit of a management node may receive information from a memory. A processing circuit may transmit information from the memory via the communication devices. A processing circuit may receive information via the communication devices. A processing circuit may store received information in the memory. A memory of a management node may store provisioning information of client devices that may communicate with the network. A memory of a management node may store information for authenticating client devices. A memory of a management node may store information for determining the security of communicating with a client device.

In this example, client 270 and client 280 include provisioning information 272 and 282 respectively. Client 270 may provide provisioning information 272 to base station 250 and client 280 may provide provisioning information to base station 254 to establish communication with network 200. Once client 270 and/or client 280 have established communication with network 200, client 270 and/or client 280 may communicate with server 262.

Client 270 and client 280 may further provide authentication and/or security information to base station 250 and base station 254. Base station 250 and base station 254 may determine whether the authentication and/or security information provided by client 270 and client 280 permits client 270 and/or client 280 communicate with network 200.

A base station may include a processing circuit, a memory, and communication devices. A memory may store information for authenticating and verifying the security of client devices that wish to communicate with network 200. A processing circuit may access the memory to store and retrieve information. A processing circuit may perform the operation of authenticating a client device. A processing circuit may perform the operation of verifying security information provided by a client device. A processing circuit may control the operation of a communication device to establish or terminate communication with a client device in accordance with verification or lack of verification respectively of authentication or security information provided by a client device.

In another example, network 300 is a different network from network 302. Network 300 and network 302 are independent of each other and do not cooperate (e.g., share information, share traffic, share provisioning information, share authentication information, share security information) with each other. Network 300 includes central management node 310, central provisioning information 312, management nodes 320-322, transmission network 334, and base stations 330-332. Server 336 communicates with network 300 via a wired connection. Client 340 is a mobile client authorized to communicate with network 300. Central management node 310 and management nodes 320-322 form the NMS of network 300. Central management node 310 and management nodes 320-322 are arranged hierarchically with central management node 310 placed at the top of the hierarchy at level 380 and management nodes 320-322 lower in the hierarchy at level 390.

Network 302 includes central management node 350, central provisioning information 352, management nodes 360-362, transmission network 374, and base stations 370-372. Server 376 communicates with network 302 via a wired connection. Client 340 is a mobile client authorized to communicate with network 302. Central management node 350 and management nodes 360-362 form the NMS of network 302. Central management node 350 and management nodes 360-362 are arranged hierarchically with central management node 350 placed at the top of the hierarchy at level 380 and management nodes 360-362 lower in the hierarchy at level 390.

Provisioning information 342 may include information for client 340 to establish communication with network 300 or network 302. Client 340 may communicate wirelessly with network 300 using a first conventional wireless protocol. Client 340 may communicate wirelessly with network 302 using the same or a different conventional wireless protocol. Client 340 may include any conventional hardware (e.g., radios, antennas) and software (e.g., wireless protocol) to wirelessly communicate with two or more networks using different wireless communication protocols. Client 340 may communicate with two independent networks substantially at the same time (e.g., simultaneously, in parallel). Client 340 may communicate with independent networks using different conventional channels (e.g., frequencies). The provisioning information provided by client 340 to networks 300 and 302 may be different.

In this example, the provisioning information used by client 340 to establish a connection with network 300 is different than the provisioning information used by client 340 to establish a connection with network 302. Client 340 may further store information for identifying a network. Client 340 may use network identifying information to select provisioning information from provisioning information 342 for providing to a network. Client 340 may use network identifying information to further select authentication and/or security information for providing to a network.

Client 340 may provide provisioning information from provisioning information 342 for network 300 to base station 332. Client 340 may further provide authentication and/or security information for network 300 to base station 332. Base station 332 may use the provisioning information to provide service to client 340 without receiving provisioning information from central provisioning information 312. Base station 332 may use the authentication and/or security information provided by client 340 to determine whether base station 332 will communicate with client 340.

When appropriate (e.g., when in range), client 340 may provide provisioning information from provisioning information 342 for network 302 to base station 370. Client 340 may further provide authentication and/or security information for network 302 to base station 370. Base station 370 may use the provisioning information to provide service to client 340 without receiving provisioning information from central provisioning information 352. Base station 370 may use the authentication and/or security information provided by client 340 to determine whether base station 370 will communicate with client 340.

For example, provisioning information for communicating with network 300 may include the information provided in Table 2 and the provisioning information for communicating with network 302 may include the information provided in Table 3.

TABLE 2

Provisioning Information for Network 300

| Type | Group | Parameter | Value |
| --- | --- | --- | --- |
| Authority | | Creation date | Dec. 15, 2010 |
| Authority | | Effective date | Jan. 01, 2011 |
| Authority | | Revision number | 6.021 |
| QoS | | Minimum bandwidth | 5 MHz |
| QoS | | Maximum bandwidth | 20 MHz |
| QoS | | Delay | 200 ms |
| QoS | | Jitter | 20 ms |
| QoS | | Packet loss rate | 0.5% |
| QoS | | Bit loss rate | 0.1% |
| Radio | | Modulation | QAM64 |
| Radio | | Antenna configuration | 88° N |
| Statistics | Interface L2 rates | tx_data | |
| Statistics | Interface L2 rates | rx_data | |
| Statistics | Interface L2 rates | tx_frame | |
| Statistics | Interface L2 rates | rx_frame | |
| Statistics | Interface L3 rates | tx_packet_rate | |
| Statistics | Interface L3 rates | rx_packet_rate | |
| Statistics | Interface L3 rates | tx_err_rate | |
| Statistics | Interface L3 rates | rx_err_rate | |
| Statistics | Connection L1 | modulation1 | |
| Statistics | Connection L1 | rssi | |
| Statistics | Connection L1 | cinr | |

TABLE 3

Provisioning Information for Network 302

| Type | Group | Parameter | Value |
| --- | --- | --- | --- |
| Authority | | Creation date | Oct. 24, 2011 |
| QoS | | Minimum bandwidth | 5 MHz |
| QoS | | Delay | 20 us |
| Statistics | Interface L3 rates | tx_packet_rate | |
| Statistics | Interface L3 rates | rx_packet_rate | |
| Statistics | Interface L3 rates | tx_err_rate | |
| Statistics | Interface L3 rates | rx_err_rate | |
| Statistics | Connection L1 | rssi | |
| Statistics | Connection L1 | cinr | |

The provisioning data that Client 340 provides to network 300 includes QoS requirements, radio requirements, and a request to collect certain statistics. Network 300 determines whether it can provide communication in accordance with some or all of the provisioning requirements specified in Table 2. The provisioning data that client 340 provides to network 302 includes fewer QoS, radio, and statistics requirements than the provisioning information for network 300. Base station 332 determines whether network 300 may provide communication in accordance with at least a portion of the provisioning requirements specified in Table 2. Base station 370 determines whether network 302 may provide communication in accordance with at least a portion of the provisioning requirements specified in Table 3.

Clients and networks may perform methods 400-700 to provide provisioning information, receive provisioning information, provisioning a network for communication, authenticating a client, verifying the security of a client, and updating provisioning information. Clients and networks may use any conventional electronic components for performing the processes of methods 400-700. Clients and networks may perform methods 400-700 using any conventional communication protocol (e.g., IPX/SPX, X.25, TCP/IP, IEEE 802.3 Ethernet, IEEE 802.11 wireless LAN, IEEE 802.16 WiMax, Bluetooth, GSM).

Each process of methods 400-700 may perform its function whenever sufficient input information is available. For example, processes may perform their functions serially, in parallel, simultaneously, or in an overlapping manner. An apparatus performing methods 400-700 may implement one or more processes in any combination of programmed digital processors, logic circuits and/or analog control circuits. Interprocess communication may be accomplished in any conventional manner (e.g., subroutine calls, pointers, stacks, common data areas, messages, interrupts, asynchronous signals, synchronous signals). The processes of methods 400-700 may be performed by any conventional hardware including computers, servers, processing circuits, memory, and communication devices.

Figure 4:
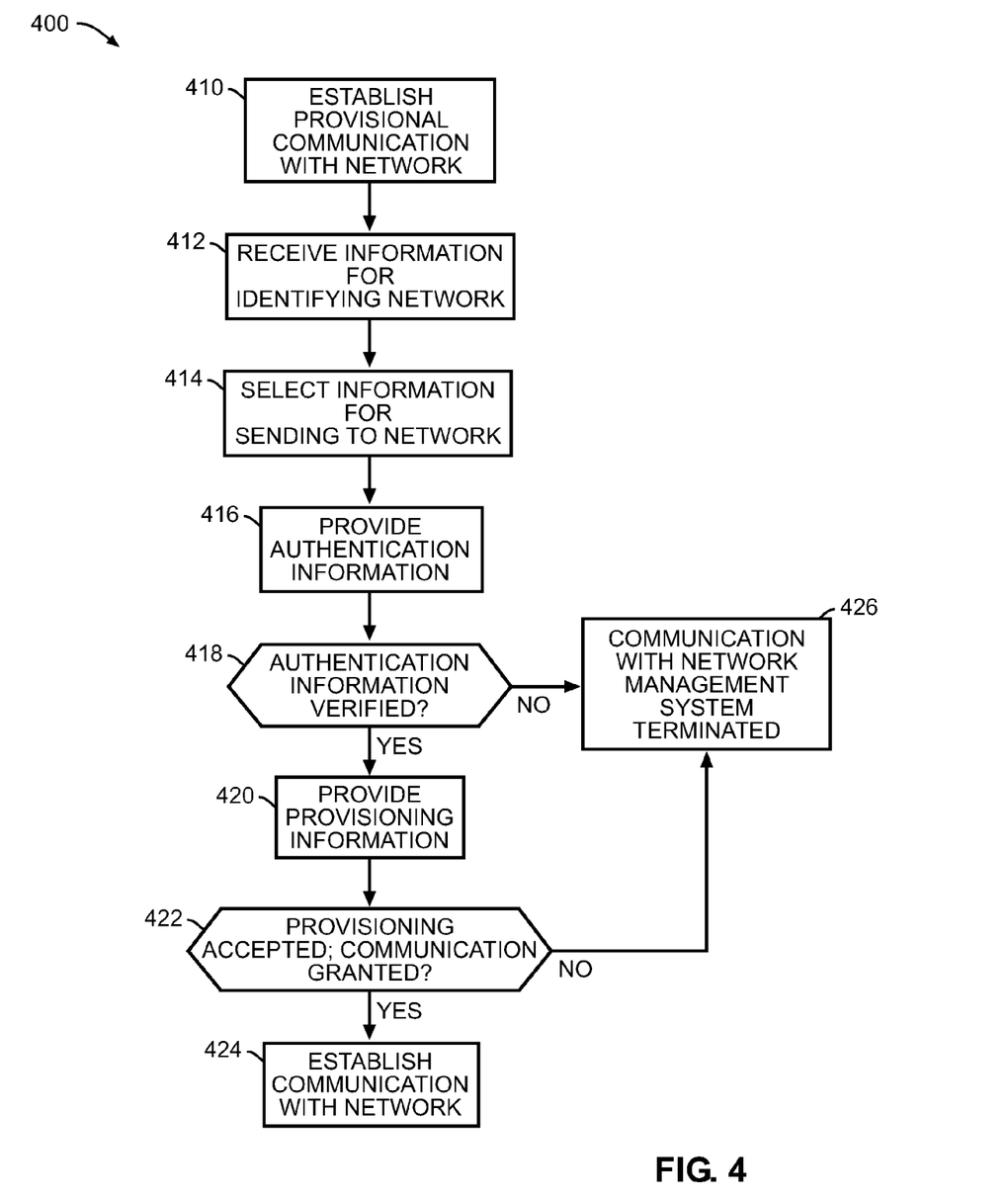
FIG. 4 is state diagram of a method performed by a client device for providing provisioning information to a telecommunication network according to various aspects of the present invention.

A client may perform method 400 to provide provisioning information to a network to attempt to receive services from the network. Method 400 includes processes establish provisional process 410, receive process 412, select process 414, provide process 416, verified process 418, provide process 420, granted process 422, establish process 424, and terminated process 426.

Methods performed by a client may be controlled by a processing circuit of the client. The processing circuit may receive information, provide information, control the execution of an algorithm, and/or coordinate the operation of other components (e.g., memory, communication devices) of the client to accomplish performance of the method.

Establish provisional process 410 includes any conventional method for a client to establish communication with a network for the purpose of determining whether the network will provide services to the client. During process 410, a client and/or a network may provide (e.g., exchange) any information necessary for analysis by the client and/or the network, so the network may determine whether to provide services to the client and/or the client may determine whether to receive services from the network. Establish provisional process 410 may be performed in accordance a communication mode of a conventional communication protocol. For example, provisional communication may be established using the IEEE 802.11 wireless protocol during the communication that occurs between a base station and a client during the process of association.

In receive process 412, the client may use the communication link (e.g., connection, channel) to receive information as to the identity of the network. Receive process 412 may use any conventional method for receiving information about the identity of a network. For example, receive process 412 may include the client transmitting a query to the network to receive information about the network. Receive process 412 may include the client receiving a beacon from a base station that includes information for identifying the network.

In select process 414, the client uses the information regarding the identity of the network to determine the information that should be sent to the network to attempt to establish communication. The client may use the network identity information to select information for sending to the network. Information may include provisioning information, authenticating information, and/or security information. Information selected for sending to a network may be a portion of the information stored by the client for establishing communication with a number of networks. Information selected for sending to a network may be unique to the network or common for establishing communication with many networks.

Select process 414 may include reading information from a memory.

In provide process 416, the client may provide information that may be used by the network to authenticate (e.g., verify, identify, establish) the identity of the client. Any conventional authentication technique (e.g., public/private key) may be used to establish the identities and/or authenticity of the network and/or the client. Any type of information may be used to identify a client (e.g., MAC number, assigned number). Authentication information may further include information about the type of security provided by the client and/or required by the client. Security information may be provided in the form of a security profile.

Provide process 416 may include reading information from a memory and transmitting the information to a base station via the communication devices of the client. A processor of the client may access the memory to retrieve the information and control transmission of the information by the communication devices.

In verified process 418, the client receives notice as to whether the network has accepted the authentication information provided by the client. The client may receive notice from the network in any conventional manner. If the network does not accept the authentication information provided by the client, the network may terminate the provisional communication with the client. The network may provide notice of the termination of the provisional communication or the network may simply not respond to additional queries from the client. A base station of the network may determine the authenticity of a client. A base station of the network may provide notice as to acceptance or denial of authentication information provided by the client.

If the network does not verify the authentication information provided by the client, control moves to terminated process 426. In terminated process 428, the client determines (e.g., receives notice) that the network has terminated communication with the client.

If the network verifies the authentication information provided by the client, control moves to provide process 420. In provide process 420, the client provides provisioning information to the network. The authentication information provided in process 414 and the provisioning information provided in process 420 may be provided at the same time to the network, say for example, providing the authentication and provisioning information in provide process 416, but used by the network only if the authentication process is successful.

In granted process 422, the client receives notice as to whether communication has been established in accordance with the provisioning information. The client may receive notice from the network in any conventional manner. If the network cannot provide services in accordance with the provisioning information, the network may terminate the provisional communication with the client. A network may provide a notice of termination of communication or simply stop communicating.

A network may establish communication with a client in accordance with all requirements (e.g., requests) of the provisioning information provided by the client or a portion of the requirements. For example, a client may provide provisioning information that specifies three streams (e.g., video, voice over IP, data) for communicating. A network may determine that it may provide only two streams. A network may provide a notice of the type (e.g., amount) of communication the network may provide the client. Granted process 422 may receive the notice of the type of communication granted by the network. Notice of granted communication may include simply detecting communication.

If the network determines that it can provide no communication in accordance with the provisioning information, control moves to terminated process 426 discussed above. If a network is capable of providing services in accordance with the provisioning information provided by the client, but the resources are presently in use, the network may decline to establish communication with the client because it cannot or will not allocate resources in accordance with all or a portion of the provisioning information provided by the client.

If the network determines that it may provide communication in accordance with all or a part of the provisioning information, control moves to process 424.

In process establish 424, the network establishes communication with the client. In establishing communication, the network provides resources for communication in accordance with all or a portion of the provisioning information provided by the client as discussed above.

A base station of a network may cooperate with a client to perform process 400. Process 400 may be performed by a base station of a network without cooperation of an NMS of the network.

A base station of a network may cooperate with a management node of the network to perform process 400. The management node may assist or perform authentication of the client or any other portion of establishing communication with a client; however, the client provides the provisioning information used to establish or deny service.

Figure 5:
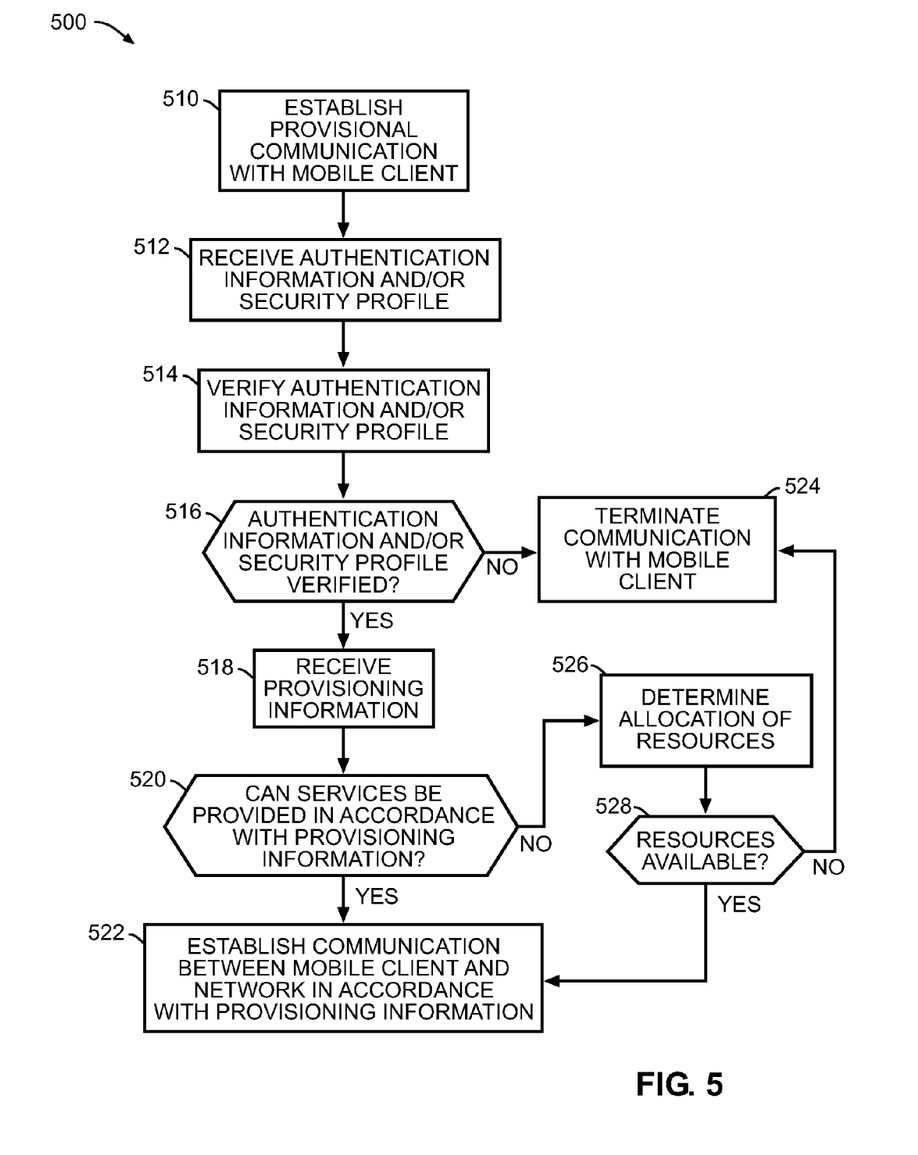
FIG. 5 is state diagram of a method performed by a telecommunication communication network management system for receiving provisioning information to establish communication.

A network may perform method 500 for receiving provisioning information from a client. A network may perform method 500 to provision the network to provide services to a client in accordance with all or a portion of the provisioning information provided by the client. The processes of method 500 may be performed by one or more than one component of the network. For example, in an implementation a base station may perform the processes of method 500. In another implementation, a base station may cooperate with other components of the network such as switches, other base stations, and/or management nodes to perform the processes of method 500. The processes of method 500 may be performed in any conventional way that a conventional network accomplishes such operations. The processes of method 500 may be performed using any conventional communication protocol.

Method 500 includes the processes establish provisional process 510, receive process 512, verify process 514, verified process 516, receive process 518, can process 520, establish process 522, terminate process 524, determine process 526, and resources process 528.

Establish provisional process 510 includes any conventional method for a network and/or a component of a network (e.g., base station) to establish communication with a client for the purpose of determining whether the network will provide services to the client and/or to determine whether the client will receive services from the network. During the performance of process 510, a client and/or a network may provide any information necessary for analysis by the client and/or the network, so the network may determine whether to provide services to the client and/or the client may determine whether to receive services from the network. Establish provisional process 510 may be performed in accordance a communication mode of a conventional communications protocol as discussed above.

In receive process 512, the network and/or a component of a network receives authentication information and/or a security profile from a client. Information may be received by the network in any conventional manner. For example, authentication information and/or a security profile may be received from a client as a packet in accordance with a communication protocol. Authentication information may include any conventional information (e.g., public key, electronic signature, cryptography) for authenticating (e.g., verifying, establishing) the identity of the client. A security profile may include any conventional information for establishing security policies for a client. Verification information may include information as to the security requested by and/or offered by the client. A security profile may include policies implemented and/or requested by a client to prevent unauthorized access, misuse, and/or modification of the client and/or the network. A security profile may include methods for authenticating a client and/or network, access policies (e.g., firewall), and communication security (e.g., encryption).

In verify process 514, the network and/or a component of the network (e.g., a base station) verifies the authentication information and/or the security profile provided by a client. Verification may include verifying the identity of the client. Verification may include verifying whether the security profile provided by the client is consistent with the security policies used by the network. A security profile may be consistent with the security policies of a network when the polices of the client and the network provide adequate security in a manner that is suitable.

If the security profile provided by the client is not consistent with the security policies of the network and/or the identity of the client cannot be authenticated, control passes to terminate process 524 to terminate communication with the client. If the security profile provided by the client is consistent with the security policies of the network and/or the identity of the client can be authenticated, control passes to receive process 518.

In receive process 518, the network and/or a component of the network receives provisioning information from a client. Provisioning information may include the provisioning information discussed herein. Provisioning information may be transferred to the network in conjunction with the authentication information and/or the security profile. For example, once provisional communication has been established between the network and the client, the client may send one or more packets of information that include authentication information, a security profile, and/or provisioning information.

In can process 520, the network and/or one or more components of the network (e.g., a base station) determines whether services may be provided to a client in accordance with all or a portion of the provisioning information provided by the client. The determination as to whether the network is capable of providing services in accordance with the provisioning information provided by the client may be accomplished in any conventional manner used to assess the capacity and/or resources of a network. Assessment of the resources available and/or in use in a network may be accomplished using any conventional method. If the network determines that the resources are available to provide all or a portion of the services requested in the provisioning information, control passes to establish process 522. If the network determines that the resources needed to provide services in accordance with all or a portion of the provisioning information provided by the client are not available, control passes to determine process 526.

In determine process 526, the network determines how and/or whether to allocate resources in accordance with all or a portion of the provisioning information provided by the client. The determination as to whether to allocate resources to the client may be accomplished using any conventional method and/or criteria. Any conventional method and/or criteria may be used to determine how and/or whether to reallocate resources to provide services to the client. In the event that the network determines to reallocate resources to provide service to the client, the network may use any conventional method and/or criteria for reallocating resources. A reallocation of resources may include terminating service to other clients that are presently being serviced by the network in order to use some or all of the resources to provide service to the client.

Determine process 526 may determine that resources may be allocated to provide only part of the services requested by the client in the provisioning information provided by the client. For example, the provisioning information provided by the client may request three streams (e.g., video, voice over IP, data) for the communication of data. Determine process 526 may determine that the network cannot or will not provide all three streams of communication but that it may provide one stream (e.g., data) for communication.

In resources process 528, the network determines whether the resources are available to provide service to the client in accordance with the determination made by determine process 526. If the resources allocated by determine process 526 are available, control moves to establish process 522. If the resources are not available, control moves to terminate process 524.

In terminate process 524, the network terminates provisional communication with the client. The network may terminate communication with the client for a variety of reasons including inability to authenticate the identity of the client, inconsistencies between the security profile of the client and the security policies of the network, unavailability of resources to provide services to the client in accordance with all or a portion of the provisioning information provided by the client. The network may terminate communication with the client in any conventional manner using any conventional communications protocol.

In establish process 522, the network establishes communication with and/or provides services to the client in accordance with all or a portion of the provisioning information provided by the client. Communication may be established in any conventional manner in accordance with any conventional communications protocol. Establish process 522 may further provide notice to the client of the type of communication provided to the client. Notice of the type of communication established (e.g., video, data, voice over IP, guaranteed bandwidth, best effort) may be provided in any conventional manner.

The provisioning information provided by a client may be used to update provisioning information stored by an NMS of a network and/or the provisioning information stored by an NMS of a network may be used to update the provisioning information stored by a client.

Provisioning information may include information regarding the authority of the provisioning information. Authority information may include information (e.g., parameter) regarding recency of the provisioning information such as creation date, issue date, effective date, and/or revision number. Creation date, issue date, and/or effective date may be expressed as a date-stamp (e.g., date, date and time). Authority information may further include information as to the entity that issued the provisioning information. Authority information may be used to detect a more recent version of provisioning information and/or a more authoritative version of the provisioning information. Authority information may apply to all or a portion of the information of provisioning information. Authority information may be used to determine the recency and/or authority of the provisioning information as an entirety and/or the recency and/or authority of portions of the provisioning information. Information regarding the authority of provisioning information may be used to update provisioning information in the NMS and/or the client.

Figure 6:
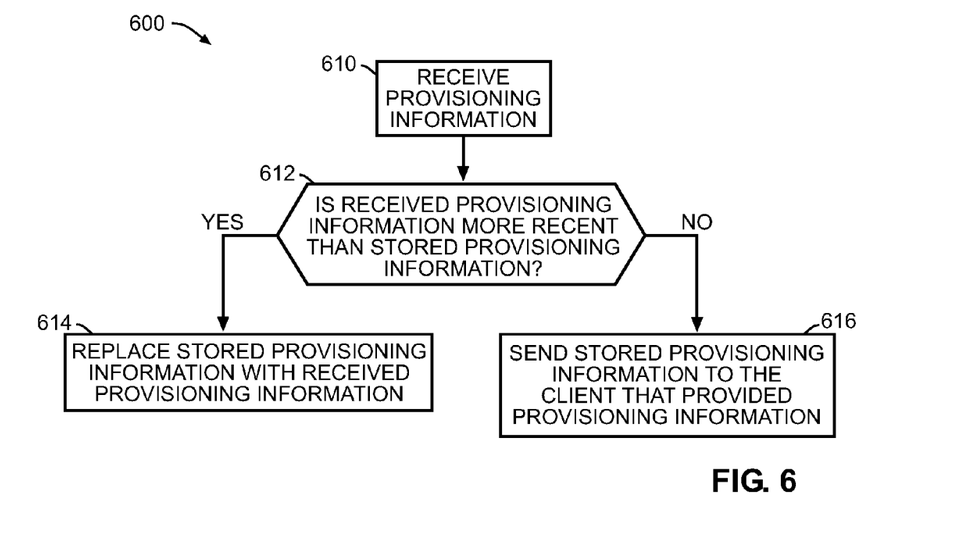
FIG. 6 is state diagram of a method performed by a telecommunication network management system for updating operational information.

In method 600, an NMS uses recency information from the authority information to update its stored provisioning information for a client or to provide provisioning information to the client that provided the less recent provisioning information. Method 600 includes receive process 610, more recent process 612, replace process 614, and send process 616.

In receive process 610, an NMS of the network receives the provisioning information provided by a client. Any component of a network that receives provisioning information from a client may provide the provisioning information to the NMS of the network. A component of a network may immediately provide the provisioning information received from a client to the NMS or provisioning information may be stored and forwarded to the NMS when the NMS is available for communication.

In more recent process 612, the NMS determines whether the provisioning information received from the client is more recent than the provisioning information stored by the NMS for the same client. The client may be identified using any conventional techniques including authentication of the client as discussed above. The identity of the client may be provided as part of the provisioning information and/or in addition to the provisioning information. The information used to identify the client is sufficient for the NMS to identity provisioning information stored by the NMS for the client.

The process performed by process 612 may include any conventional process for determining and/or comparing the recency of the received provisioning information and the stored provisioning information. Creation date, issue date, effective date, and/or revision date may be used to determine the recency of provisioning information. For example, the process performed by process 612 may include comparing a date of creation of the provisioning information received from the client with a date of creation of the provisioning information stored by the NMS. An NMS may retrieve provisioning information from a memory for the process performed by process 612. An NMS may use the identity of the client that provided the provisioning information to retrieve the stored provisioning information related to the client.

If the provisioning information provided by the client is more recent than the provisioning information stored by the NMS, control moves to replace process 614. If the provisioning information stored by the NMS is more recent than the provisioning information provided by the client, control moves to send process 616.

Replace process 614 replaces the provisioning information stored by the NMS with the more recent provisioning information received from the client. Provisioning information may be replaced by storing the provisioning information in a memory. Replacement may include keeping a history of provisioning information for a client and/or version control.

Send process 616 sends the more recent provisioning information stored by the NMS to the client. The provisioning information may be sent to the client in any conventional way and in accordance with any conventional communication protocol.

A network administrator may update provisioning information in the NMS of the network for updating the provisioning information stored by clients as the clients establish communication with the network.

Figure 7:
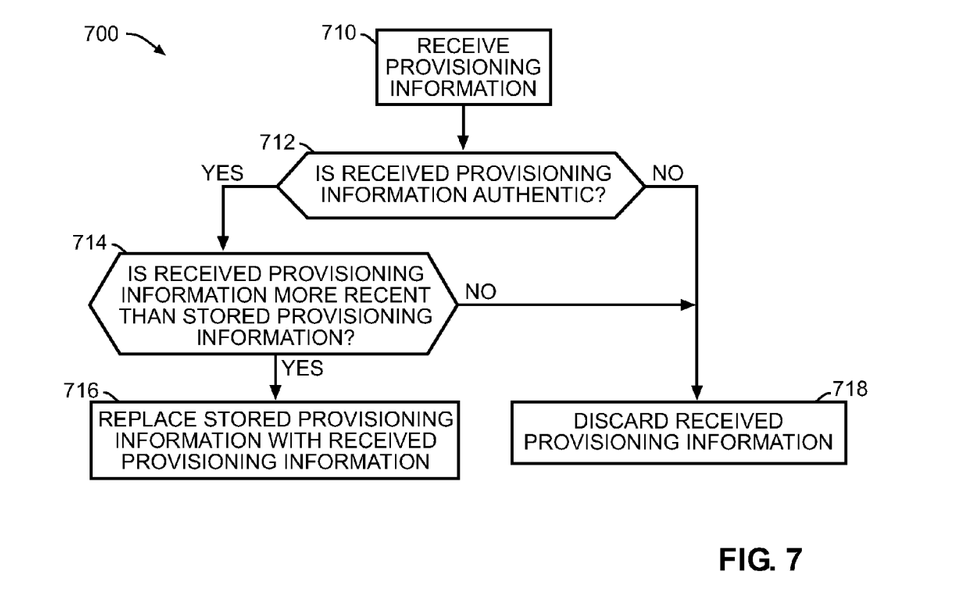
FIG. 7 is state diagram of a method performed by a client device for updating operational information.

Method 700 may be performed by a client to update the provisioning information stored by the client in accordance with information regarding recency.

Methods similar to methods 600 and 700 may be used to update provisioning information in accordance with authority information other than recency (e.g., entity).

Method 700 includes receive process 710, authentic process 712, more recent process 714, replace process 716, and discard process 718.

In receive process 710, the client receives provisioning information provided by the NMS of a network. Even though a network may establish communication with a client in accordance with provisioning information provided by the client, as opposed to provisioning information stored by the NMS, once an NMS detects that a client is communicating with the network, the NMS may send provisioning information that is stored by the NMS to the client. The network may send provisioning information to the client using any conventional process using any conventional communication protocol.

In authentic process 712, a client determines whether the provisioning information is authentic. Determining authenticity may include determine whether the provisioning information is sent from an allowed (e.g., known, secure, permitted) source. Authentication may include the authentication techniques and methods discussed above. Authentication may be performed while establishing communication with the network and may not need to be performed again to receive provisioning information. Authentication of the provisioning information may be in addition to the authentication required to establish communication with the network.

The client may further determine whether the provisioning information is related to the client or whether it is provisioning information related to a different client. If the provisioning information is related to a different client, the provisioning information may be considered as not being authentic.

If the received provisioning information is authentic, control moves to more recent process 714. If the receive provisioning information is not authentic, control moves to discard process 718.

In more recent process 712, the client determines whether the provisioning information received from the network is more recent than the provisioning information stored by the client. The process performed by process 712 may include any conventional process for determining and/or comparing the recency of the received provisioning information and the stored provisioning information as discussed above.

If the provisioning information provided by the network is more recent than the provisioning information stored by the client, control moves to replace process 716. If the provisioning information stored by the client is more recent than the provisioning information provided by the network, control moves to discard process 718.

Replace process 716 replaces the provisioning information stored by the client with the more recent provisioning information received from the network as discussed above.

Discard process 718 discards the provisioning information received from the network. Discarding may include storing the received provisioning information to maintain a history; however, discarding process 718 does not include using the received provisioning information to establish future communication with a network.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'including', and 'having' introduce an open-ended statement of component structures and/or functions. In the specification and claims, the words 'a' and 'an' are used as indefinite articles meaning 'one or more'. While for the sake of clarity of description, several specific embodiments of the invention have been described, the scope of the invention is intended to be measured by the claims as set forth below.

What is claimed is:

1. A method for configuring a network for providing wireless communication with a client in accordance with a provisioning information, the method performed by the network, the method comprising:
receiving the provisioning information from the client via wireless communication;
determining whether the network can provide services for the client in accordance all or a portion of the provisioning information;
if the network cannot provide services for the client in accordance with all or any portion of the provisioning information, terminating wireless communication with the client; and
if the network can provide services for the client in accordance with all or a portion of the provisioning information, wirelessly communicating with the client in accordance with all or the portion of the provisioning information.

2. The method of claim 1 wherein receiving comprises receiving a packet of data from the client in accordance with a wireless communications protocol, the packet includes the provisioning information.

3. The method of claim 1 wherein the provisioning information comprises information for at least one of quality of service requirements, traffic classification patterns, statistics of events, radio parameters, and authority.

4. The method of claim 1 wherein the provisioning information comprises information for at least one of minimum bandwidth, maximum bandwidth, delay, jitter, packet loss rate, and bit loss rate.

5. The method of claim 1 wherein the provisioning information comprises information for at least one of modulation and antenna configuration.

6. The method of claim 1 wherein the provisioning information comprises information for at least one of a date of creation, an entity that created provisioning information, a date of issue, an effective date, a revision number.

7. The method of claim 1 further comprising:
receiving information from the client for authenticating an identity of the client; and
authenticating the identity of the client.

8. The method of claim 1 wherein determining comprises:
determining that the network cannot provide services for the client in accordance all or the portion of the provisioning information because a resource of the network is not available; and
making the resource available so that the network can provide services to the client in accordance with all or the portion of the provisioning information.

9. A network device for wirelessly communicating with a provided wireless client, the network device coupled to a provided network, the network device comprising:
a transceiver; and
a processing circuit; wherein:
the transceiver receives a provisioning information from the wireless client via wireless communication;

if the processing circuit determines that the network device cannot provide services for the client in accordance with all or any portion of the provisioning information, the network device terminates wireless communication with the client; and if the processing circuit determines that the network device can provide services for the client in accordance with all or a portion of the provisioning information, the network device wirelessly communicates with the client in accordance with all or the portion of the provisioning information.

10. The network device of claim 9 comprises a base station.

11. The network device of claim 9 wherein the provisioning information comprises information for a minimum bandwidth.

12. The network device of claim 9 wherein the provisioning information comprises information for at least one of quality of service requirements, traffic classification patterns, statistics of events, radio parameters, and authority.

13. The network device of claim 9 wherein the provisioning information comprises information for at least one of minimum bandwidth, maximum bandwidth, delay, jitter, packet loss rate, and bit loss rate.

14. The network device of claim 9 wherein the provisioning information comprises information for at least one of modulation and antenna configuration.

15. The network device of claim 9 wherein the provisioning information comprises information for at least one of a date of creation, an entity that created provisioning information, a date of issue, an effective date, a revision number.

16. A base station for wirelessly communicating with a provided wireless client, the base station coupled to a provided network, the base station comprising:

a transceiver; and a processing circuit; wherein:

the transceiver receives a provisioning information from the wireless client via wireless communication;

the provisioning information comprises a value for a minimum bandwidth;

if the processing circuit determines that the base station cannot provide services for the client in accordance with the value of the minimum bandwidth, the base station terminates services to the client; and if the processing circuit determines that the base station can provide services for the client in accordance with the value of the minimum bandwidth, the base station wirelessly communicates with the client in accordance with the minimum bandwidth of the provisioning information.

17. The base station of claim 16 wherein:

the provisioning information further includes a value for at least one of maximum bandwidth, delay, jitter, packet loss rate, and bit loss rate;

if the processing circuit determines that the base station can wirelessly communicate with the client in accordance with all values of the provisioning information, the base station wirelessly communicates with the client in accordance with all values of the provisioning information.

18. The base station of claim 16 wherein:

the provisioning information further includes a request to monitor at least one statistic;

if the processing circuit determines that the base station can monitor the at least one statistic, the base station monitors the at least one statistic.

\* \* \* \* \*